(12) United States Patent
Nagatomo et al.

(10) Patent No.: US 12,340,997 B2
(45) Date of Patent: Jun. 24, 2025

(54) MASS SPECTROMETRY METHOD AND INFORMATION PROCESSING DEVICE

(71) Applicant: JEOL Ltd., Tokyo (JP)

(72) Inventors: Kenji Nagatomo, Tokyo (JP); Masaaki Ubukata, Tokyo (JP); Ayumi Kubo, Tokyo (JP)

(73) Assignee: JEOL Ltd., Tokyo (JP)

( * ) Notice: Subject to any disclaimer, the term of this patent is extended or adjusted under 35 U.S.C. 154(b) by 428 days.

(21) Appl. No.: 17/746,064

(22) Filed: May 17, 2022

(65) Prior Publication Data

US 2022/0375737 A1 Nov. 24, 2022

(30) Foreign Application Priority Data

May 18, 2021 (JP) .................................. 2021-083702

(51) Int. Cl.
*H01J 49/00* (2006.01)
*G01N 30/72* (2006.01)
*G01N 30/86* (2006.01)
*H01J 49/26* (2006.01)

(52) U.S. Cl.
CPC .......... *H01J 49/0036* (2013.01); *G01N 30/72* (2013.01); *G01N 30/8631* (2013.01); *H01J 49/26* (2013.01)

(58) Field of Classification Search
USPC .......................................................... 702/27
See application file for complete search history.

(56) References Cited

U.S. PATENT DOCUMENTS

| 2001/0019107 | A1 | 9/2001 | Maekawa et al. |
| 2006/0284068 | A1* | 12/2006 | Amirav ............. H01J 49/02 250/282 |
| 2009/0076737 | A1 | 3/2009 | Wang et al. |
| 2009/0299653 | A1* | 12/2009 | Pfaff ..................... G16C 20/20 250/281 |
| 2011/0125416 | A1* | 5/2011 | Noda ................. H01J 49/0036 702/30 |

(Continued)

FOREIGN PATENT DOCUMENTS

| JP | H0434256 B2 | 6/1992 |
| JP | 2001311720 A | 11/2001 |

(Continued)

OTHER PUBLICATIONS

Office Action issued JP2021083702 on Jul. 18, 2023.

(Continued)

*Primary Examiner* — Paul D Lee
(74) *Attorney, Agent, or Firm* — The Webb Law Firm

(57) ABSTRACT

A composition estimation target peak is selected from a mass spectrum of a sample, and a group of measured isotope peaks related to the composition estimation target peak is selected. A composition candidate for the sample is estimated based on the composition estimation target peak. A distribution of a theoretical isotope peak corresponding to the composition candidate is calculated. Presence or absence of an adduct ion or a desorbed ion in the sample is determined based on a first mass difference between isotopes in a distribution of the measured isotope peaks and a second mass difference between isotopes in the distribution of the theoretical isotope peak.

6 Claims, 8 Drawing Sheets

(56) References Cited

U.S. PATENT DOCUMENTS

| | | | |
|---|---|---|---|
| 2014/0361159 A1* | 12/2014 | Pfaff | H01J 49/0036 |
| | | | 250/281 |
| 2018/0240659 A1 | 8/2018 | Strohalm et al. | |
| 2018/0356377 A1* | 12/2018 | Mukousaka | G01N 30/72 |
| 2020/0211831 A1* | 7/2020 | Thoeing | H01J 49/0036 |
| 2021/0175060 A1* | 6/2021 | Kubo | H01J 49/0036 |
| 2023/0307219 A1* | 9/2023 | Hirose | H01J 49/0031 |

FOREIGN PATENT DOCUMENTS

| | | | |
|---|---|---|---|
| JP | 2004271185 A | 9/2004 | |
| JP | 200896353 A | 4/2008 | |
| JP | 2008298517 A | 12/2008 | |
| JP | 6020315 B2 | 11/2016 | |
| JP | 2017173103 A | 9/2017 | |
| JP | 202094892 A | 6/2020 | |

OTHER PUBLICATIONS

Extended European Search Report issued in EP22172938.7 on Feb. 9, 2023.

Devijlder et al., A tutorial in small molecule identification via electrospray ionization-mass spectrometry: The practical art of structural elucidation, Mass Spectrometry Reviews, 2017, No. 37, pp. 607-629.

Romson and Emmer, Mass calibration options for accurate electrospray ionization mass spectrometry, International Journal of Mass Spectrometry, 2021, vol. 467, pp. 1-23.

\* cited by examiner

| c# | SAMPLE COMPONENT | COMPOSITION | ISOTOPE DISTRIBUTION SCORE BEFORE CORRECTION | α | PRESENCE DETERMINATION OF ADDUCT ION | ISOTOPE DISTRIBUTION SCORE AFTER CORRECTION | SCORE DIFFERENCE |
|---|---|---|---|---|---|---|---|
| 1 | Propoxur | C11H15NO3 | 0.968 | 0.01361 | Yes | 0.980 | 0.012 |
| 2 | Cadusafos | C10H23O2PS2 | 0.880 | 0.01131 | Yes | 0.889 | 0.009 |
| 3 | Cyanophos | C9H10NO3PS | 0.974 | -0.06485 | No | - | - |
| 4 | BENFURESATE | C12H16O4S | 0.984 | -0.02826 | No | - | - |
| 5 | DICHLOFENTHION | C10H13Cl2O3PS | 0.878 | -0.04894 | No | - | - |
| 6 | PROPANIL | C9H9Cl2NO | 0.941 | -0.00887 | No | - | - |
| 7 | CHLORPYRIFOS-METHYL | C7H7Cl3NO3PS | 0.919 | 0.02055 | Yes | 0.899 | -0.020 |
| 8 | Metribuzin | C8H14N4OS | 0.790 | 0.15504 | Yes | 0.887 | 0.096 |
| 9 | AMETRYN | C9H17N5S | 0.679 | 0.56294 | Yes | 0.901 | 0.222 |
| 10 | CINMETHYLIN | C18H26O2 | 0.913 | 0.07971 | Yes | 0.979 | 0.066 |
| 11 | PROMETRYN | C10H19N5S | 0.740 | 0.17016 | Yes | 0.853 | 0.112 |
| 12 | PIRIMIPHOS-METHYL | C11H20N3O3PS | 0.990 | -0.09879 | No | - | - |
| 13 | DIMETHYLVINPHOS-E | C10H10Cl3O4P | 0.884 | -0.00887 | No | - | - |
| 14 | Metolachlor | C15H22ClNO2 | 0.857 | 0.02995 | Yes | 0.845 | -0.012 |
| 15 | DIMETHYLVINPHOS-E | C10H10Cl3O4P | 0.884 | -0.00887 | No | - | - |
| 16 | DCPA | C10H6Cl4O4 | 0.956 | 0.01361 | Yes | 0.956 | 0.000 |
| 17 | Cyanazine | C9H13ClN6 | 0.851 | -0.01325 | No | - | - |

FIG. 3

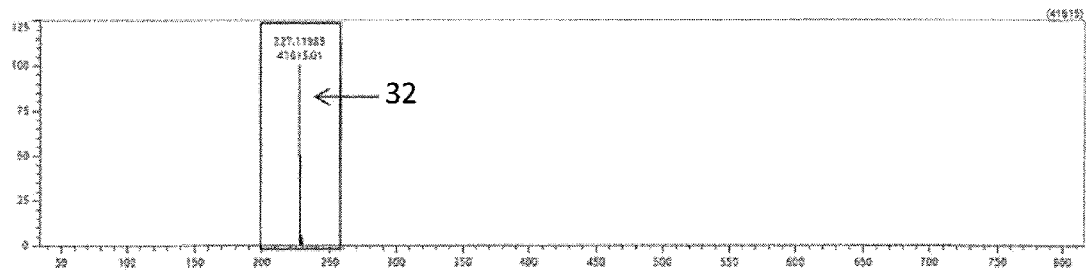
FIG. 5
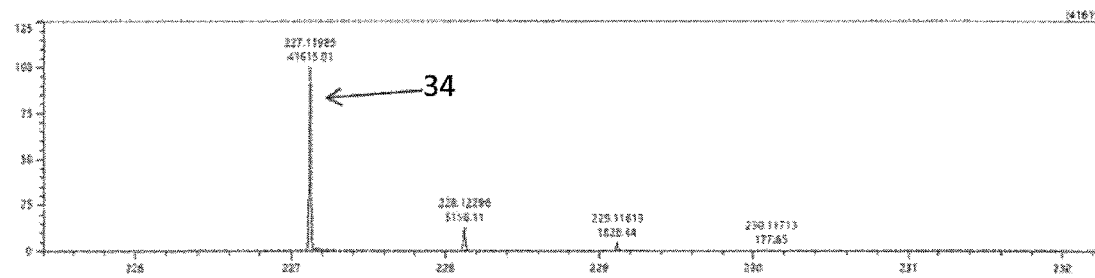
FIG. 6
| s# | COMPOSITION | m/z (CALCULATION) |
|---|---|---|
| 1 | C9H17N5S | 227.11992 |
| 2 | C11H19N2OS | 227.12126 |
| 3 | C14H15N2O | 227.11789 |
| 4 | C12H13N5 | 227.11655 |
FIG. 7
| s = 1 | (a) THEORETICAL ISOTOPE DISTRIBUTION | | (b) MEASURED ISOTOPE DISTRIBUTION | | (c) AFTER INTENSITY CORRECTION |
|---|---|---|---|---|---|
| $P_n$ | $m_{tn}$ | $I_{tn}$ | $m_{jn}$ | $I_{jn}$ | $I'_{jn}$ |
| 0 | 227.11992 | 1 | 227.11985 | 1 | 1 |
| 1 | 228.12214 | 0.125771 | 228.12482 | 0.210394 | 0.134614 |
| 2 | 229.11691 | 0.052508 | 229.11593 | 0.063082 | 0.040361 |
| 3 | 230.11851 | 0.005583 | 230.12161 | 0.008998 | 0.005757 |
| 4 | 231.11824 | 0.000505 | | | |
| 5 | 232.11884 | 0.000034 | | | |
| 6 | 233.12035 | 0.000002 | | | |
FIG. 8

| (a) | | | | (b) |
|---|---|---|---|---|
| α | a | b | Δm | PRESENCE DETERMINATION OF ADDUCT ION |
| 0.562937 | 0.00336 | 0.00783 | 0.00497 | Yes |
FIG. 9
| s# | COMPOSITION | DETERMINATION OF ADDUCT ION | ISOTOPE DISTRIBUTION SCORE | | SCORE RANKING | |
|---|---|---|---|---|---|---|
| | | | BEFORE CORRECTION | AFTER CORRECTION | BEFORE CORRECTION | AFTER CORRECTION |
| 1 | C9H17N5S | Yes | 0.996579 | 0.999889 | 4 | 1 |
| 2 | C11H19N2OS | Yes | 0.997447 | 0.999879 | 2 | 2 |
| 3 | C14H15N2O | Yes | 0.997692 | 0.999320 | 1 | 4 |
| 4 | C12H13N5 | Yes | 0.996930 | 0.999438 | 3 | 3 |
FIG. 10
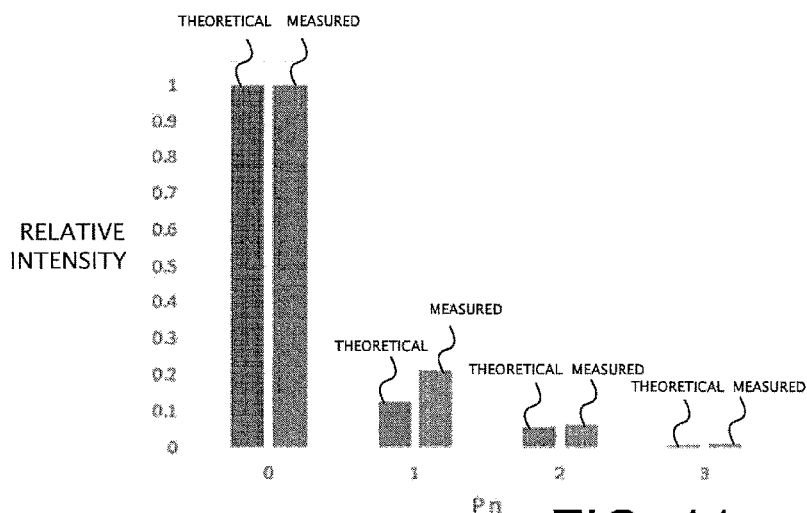
FIG. 11
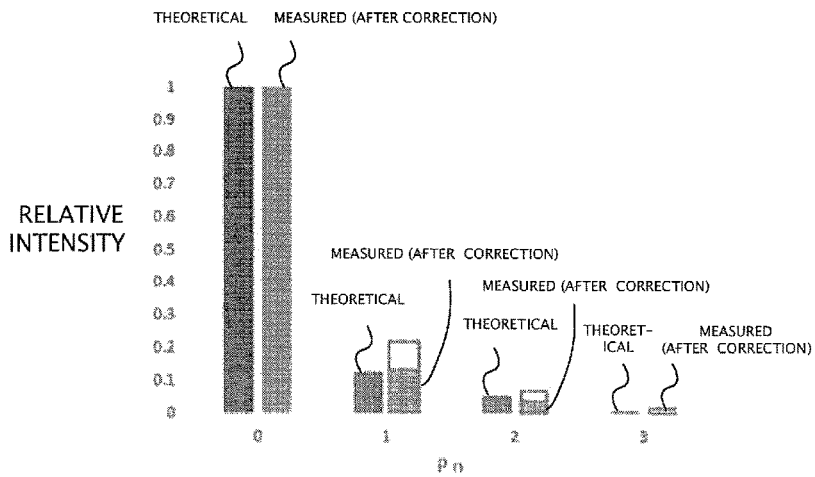
FIG. 12

| s# | COMPOSITION | DETERMINA-TION OF ADDUCT ION | ISOTOPE DISTRIBUTION SCORE | | SCORE RANKING | | TOTAL NUMBER OF ELECTRONS | | DETERMINATION OF TOTAL NUMBER OF ELECTRONS |
|---|---|---|---|---|---|---|---|---|---|
| | | | BEFORE CORRECTION | AFTER CORRECTION | BEFORE CORRECTION | AFTER CORRECTION | | | |
| 1 | C9H17N5S | Yes | 0.996579 | 0.999889 | 2 | 1 | 121 | ODD | Yes |
| 2 | C11H19N2O5 | Yes | 0.997447 | | | | 122 | EVEN | No |
| 3 | C14H15N2O | Yes | 0.997692 | | | | 120 | EVEN | No |
| 4 | C12H13N5 | Yes | 0.996930 | 0.999438 | 1 | 2 | 119 | ODD | Yes |

MASS SPECTROMETRY METHOD AND INFORMATION PROCESSING DEVICE

CROSS REFERENCE TO RELATED APPLICATION

This application claims priority to Japanese Patent Application No. 2021-083702 filed May 18, 2021, the disclosure of which is hereby incorporated by reference in its entirety.

BACKGROUND OF THE INVENTION

Field of the Invention

The present disclosure relates to a mass spectrometry method and an information processing device.

Description of Related Art

In general, for compound identification in a gas chromatography mass spectrometer (GCMS), a library search using a spectrum obtained by an electron ionization (EI) method, which is an example of a hard ionization method, is useful. The spectrum obtained by the EI method stably shows a unique fragment pattern reflecting the composition and structure of a compound. Therefore, the compound can be identified based on a degree of matching between a known spectrum registered in a library in advance and the spectrum obtained by the EI method.

However, in the method using the library, the compound cannot be identified unless the spectrum obtained by the EI method is a spectrum of a known substance registered in the library.

Meanwhile, in a soft ionization method such as a chemical ionization (CI) method, a field ionization (FI) method, a photoionization (PI) method, or a field desorption ionization (FD) method, since a molecular weight-related ion (an ion that can obtain molecular weight information, such as a molecular ion and a cation-added molecule) of the compound is easily detected, the soft ionization method is useful for the compound identification. By combining with a high resolution mass spectrometer capable of acquiring a precise mass, such as a time-of-flight mass spectrometer, a precise mass of the molecular weight-related ion can be obtained, and a molecular composition of the compound can be estimated. Processing of estimating the molecular composition of the compound (hereinafter, referred to as the "composition estimation processing") is processing of calculating a composition having a theoretical mass included within a tolerance with respect to a measured precise mass in a range of types and the number of predetermined elements.

In the composition estimation processing, when identifying an unknown substance, a correct composition cannot be calculated unless a wide range of conditions is set. However, if the wide range of conditions is set, a plurality of composition candidates will be calculated. In order to specify the correct composition from the plurality of composition candidates, it is necessary to comprehensively consider a plurality of indexes.

A distribution of an isotope peak may be used as one index. A distribution of a theoretical isotope peak is calculated, a degree of matching between a distribution of a measured isotope peak and the distribution of the theoretical isotope peak is calculated, and the composition may be specified from the composition candidates by using the degree of matching.

A total number of electrons may be used as another index. When it is known in advance whether a molecular weight-related ion is a molecular ion or a cation-added molecule (or desorbed ion), the composition can be specified by using the total number of electrons. When the molecular weight-related ion is known to be the molecular ion, since the total number of electrons is odd, only candidates having an odd total number of electrons can be narrowed down from the composition candidates. When the molecular weight-related ion is known to be the cation-added molecule, since the total number of electrons is even, only candidates having an even total number of electrons can be narrowed down from the composition candidates.

The EI method is a method of making an electron collide with a neutral molecule of a compound to ionize the electron, and an electron in a molecule is released by collision of the electron, and further, a bond between molecules is cleaved. In the EI method, a molecular ion and a fragment ion are produced. Depending on the compound, it may be the case that the molecular ion cannot be detected by any means, and only the fragment ion may be detected. Due to a principle of ionization, no cation-added molecule is produced.

Meanwhile, the soft ionization method is an ionization method that applies as small a load as possible to a molecule of a compound. The molecular ion and the cation-added molecule are easily produced, and a production amount of the fragment ions is small.

JP H4-34256 B describes a method of displaying a measured isotope pattern and a pattern based on an isotope abundance ratio.

JP 6020315 B describes a method of obtaining a monoisotopic ion peak by comparing an envelope of an isotope peak with an envelope of a theoretical isotope distribution.

JP 2008-96353 A describes a method of creating a predicted isotope pattern based on peak information and determining presence or absence of a peak interference based on a degree of matching between the isotope pattern and a peak of spectrum data.

Incidentally, whether a molecular ion and a protonated molecule (or desorbed ion) are detected at the same time cannot be determined from a mass spectrum of an unknown component. When the molecular ion and the protonated ion (desorbed ion) are detected at the same time, since an isotope distribution of the molecular ion deviates from a theoretical value, whether the obtained composition is a correct composition cannot be evaluated, and an accuracy of identification is lowered.

Since whether a peak of the molecular weight-related ion is a peak of the molecular ion or a peak of the protonated molecule (or the desorbed ion) cannot be determined, compositions of the molecular ion and the protonated molecule (or the desorbed ion) are mixed in the composition candidates obtained from the molecular weight-related ion. Therefore, identification of the compound becomes difficult.

An object of the present disclosure is to provide a mechanism capable of determining presence or absence of an adduct ion or a desorbed ion in a sample from a mass spectrum measured by performing mass spectrometry on the sample.

SUMMARY OF THE INVENTION

An aspect of the present disclosure is a mass spectrometry method, including: selecting a composition estimation target peak from a mass spectrum measured by performing mass spectrometry on a sample, and a group of measured isotope peaks related to the composition estimation target peak; estimating a composition candidate of the sample based on the composition estimation target peak; calculating a distribution of a theoretical isotope peak corresponding to the composition candidate; and determining presence or absence of an adduct ion or a desorbed ion in the sample based on a first mass difference between isotopes in a distribution of the measured isotope peaks and a second mass difference between isotopes in the distribution of the theoretical isotope peak.

In the above mass spectrometry method, an abundance ratio of the adduct ion or the desorbed ion in the sample may be further calculated based on a difference between the first mass difference and the second mass difference.

In the above mass spectrometry method, an intensity of the measured isotope peak is further corrected based on the abundance ratio, and then an intensity of the corrected measured isotope peak may be calculated.

In the above mass spectrometry method, a degree of matching between an intensity of a distribution of the corrected measured isotope peaks and an intensity of the distribution of the theoretical isotope peak may be further calculated.

In the above mass spectrometry method, a plurality of composition candidates for the sample are estimated based on the composition estimation target peak, the distribution of the theoretical isotope peak is calculated for each of the composition candidates, the abundance ratio is calculated for each of the composition candidates, the intensity of the measured isotope peaks is corrected based on the abundance ratio, and then the intensity of the corrected measured isotope peaks is calculated for each of the composition candidates, a degree of matching between the intensity of the corrected measured isotope peaks and the intensity of the theoretical isotope peak is calculated for each of the composition candidates, and the degree of matching may be displayed for each of the composition candidates.

An aspect of the present disclosure is an information processing device, including: a mass spectrometry unit configured to produce a mass spectrum by performing mass spectrometry on a sample; a selection unit configured to select a composition estimation target peak from the mass spectrum, and a group of measured isotope peaks related to the composition estimation target peak; an estimation unit configured to estimate a composition candidate of the sample based on the composition estimation target peak; a first calculation unit configured to calculate a distribution of a theoretical isotope peak corresponding to the composition candidate; and a determination unit configured to determine presence or absence of an adduct ion or a desorbed ion in the sample based on a first mass difference between isotopes in a distribution of the measured isotope peaks and a second mass difference between isotopes in the distribution of the theoretical isotope peak.

The above information processing device may further include a second calculation unit configured to calculate an abundance ratio of the adduct ion or the desorbed ion in the sample based on a difference between the first mass difference and the second mass difference.

The above information processing device may further include a third calculation unit configured to correct an intensity of the measured isotope peaks based on the abundance ratio, and then calculate an intensity of the corrected measured isotope peaks.

The above information processing device may further include a fourth calculation unit configured to calculate a degree of matching between an intensity of a distribution of the corrected measured isotope peaks and an intensity of the distribution of the theoretical isotope peak.

The above information processing device further includes a display control unit configured to display information on a display unit. The estimation unit may estimate a plurality of composition candidates for the sample based on the composition estimation target peak, the first calculation unit may calculate the distribution of the theoretical isotope peak for each of the composition candidates, the second calculation unit may calculate the abundance ratio for each of the composition candidates, the third calculation unit may calculate the intensity of the corrected measured isotope peaks for each of the composition candidates, the fourth calculation unit may calculate a degree of matching between the intensity of the corrected measured isotope peaks and the intensity of the theoretical isotope peak for each of the composition candidates, and the display control unit may display the degree of matching on the display unit for each of the composition candidates.

According to the present disclosure, presence or absence of an adduct ion or a desorbed ion in a sample can be determined based on a mass spectrum measured by performing mass spectrometry on the sample.

BRIEF DESCRIPTION OF DRAWINGS

Embodiment(s) of the present disclosure will be described based on the following figures, wherein:

FIG. 3 is a diagram illustrating a processing result of the first embodiment;

FIG. 5 is a diagram illustrating a mass spectrum;

FIG. 6 is a diagram illustrating the mass spectrum;

FIG. 7 is a diagram illustrating estimated composition candidates;

FIG. 8 is a diagram illustrating a distribution of a theoretical isotope peak and a distribution of measured isotope peaks;

FIG. 9 is a diagram illustrating an abundance ratio of an adduct ion;

FIG. 10 is a diagram illustrating a spectrometry result of the second embodiment;

FIG. 11 is a diagram illustrating a comparison result of the distributions of the isotope peaks before correction;

FIG. 12 is a diagram illustrating a comparison result of the distributions of the isotope peaks after the correction;

DESCRIPTION OF THE INVENTION

Figure 1:
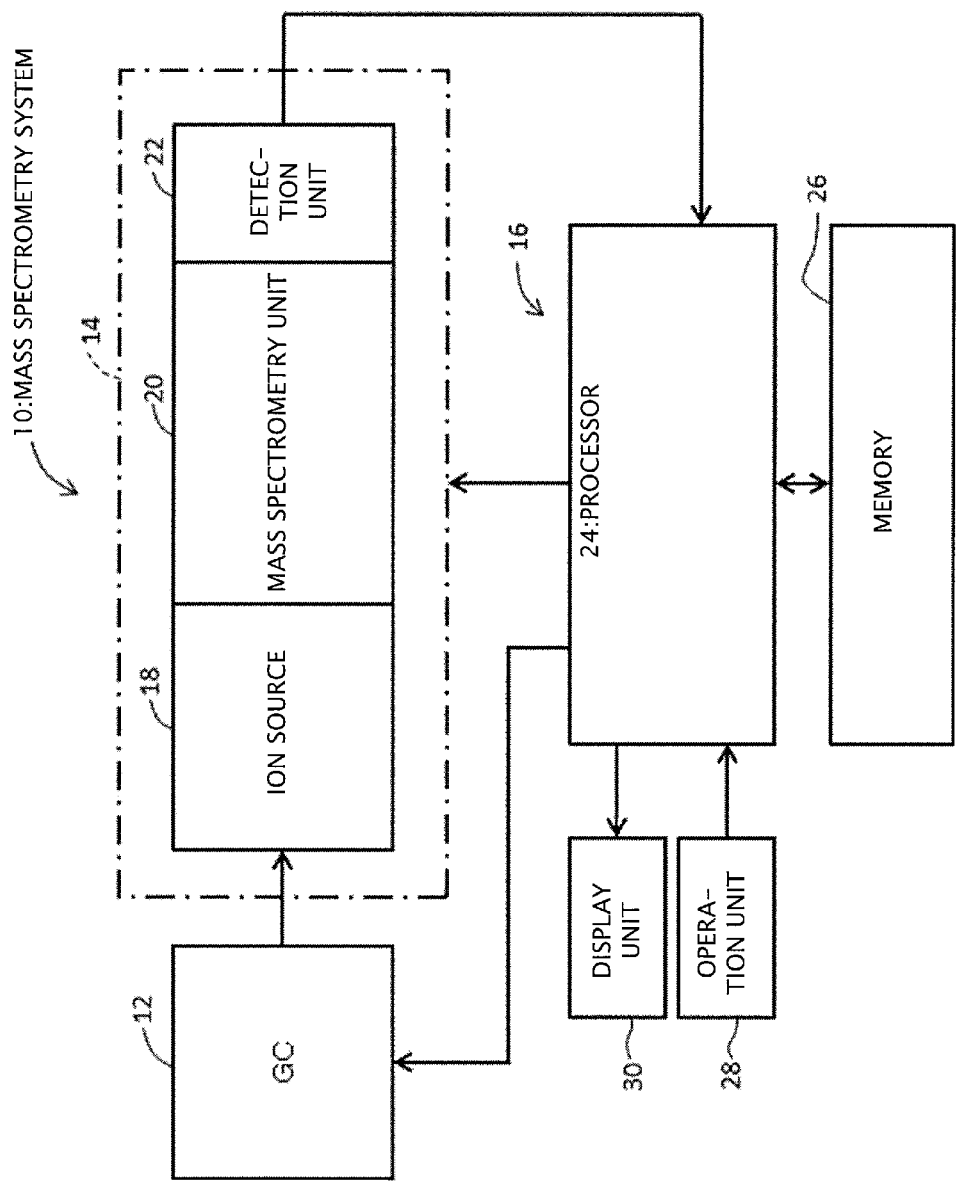
FIG. 1 is a block diagram illustrating a configuration of a mass spectrometry system according to an embodiment.

FIG. 1 illustrates an example of a configuration of a mass spectrometry system according to an embodiment. A mass spectrometry system 10 is a system that temporally separates a plurality of compounds included in an original sample and performs mass spectrometry on each compound. The mass spectrometry system 10 includes, for example, a chromatography device 12, a mass spectrometer 14, and an information processing device 16. The chromatography device 12 may not be included in the mass spectrometry system 10.

The chromatography device 12 is a gas chromatography device or a liquid chromatography device. When the original sample is introduced into the chromatography device 12, the plurality of temporally separated compounds appear on an output side. Each of the plurality of compounds is a sample to be analyzed when viewed from the mass spectrometer 14. The plurality of separated compounds are sequentially introduced into the mass spectrometer 14. The mass spectrometer 14 includes, for example, an ion source 18, a mass spectrometry unit 20, and a detection unit 22.

The ion source 18 includes a soft ion source or a hard ion source. The ion source 18 may include both the soft ion source and the hard ion source. The soft ion source is, for example, an ion source utilizing a field ionization (FI) method, a chemical ionization (CI) method, a photoionization (PI) method, a field desorption ionization (FD) method, or the like. The hard ion source is, for example, an ion source utilizing an electron ionization (EI) method.

In the ion source 18, ions are produced from the introduced sample. The ions are introduced into the mass spectrometry unit 20 by an action of an electric field.

The mass spectrometry unit 20 performs mass spectrometry on the ions based on a mass-to-charge ratio (m/z) of the ions. For example, when the mass spectrometry unit 20 is a time-of-flight mass spectrometry unit, each ion is detected by the detection unit 22 after a flight time corresponding to the m/z of the ions. Other types of the mass spectrometry units (for example, a magnetic field sector mass spectrometry unit or a quadrupole mass spectrometry unit) may be utilized.

The detection unit 22 includes, for example, an electron multiplier tube and detects the ions. A detection signal is output from the detection unit 22. The detection signal is sent to the information processing device 16.

The information processing device 16 includes a processor 24, a memory 26, an operation unit 28, and a display unit 30. The processor 24 is implemented by, for example, a central processing unit (CPU) that executes a program. A circuit or the like that performs arithmetic, control, or processing may be used in place of the processor 24 or together with the processor 24. The information processing device 16 may be implemented by a plurality of computers. Some functions of the information processing device 16 may be provided via a communication path such as a network.

The processor 24 functions as an arithmetic unit, a control unit, and a processing unit. For example, the processor 24 functions as a selection unit, an estimation unit, a first calculation unit, a second calculation unit, a third calculation unit, a fourth calculation unit, a determination unit, and a display control unit. For example, these functions are implemented when the CPU executes a program.

The memory 26 is implemented by a semiconductor memory, a hard disk drive, or the like. A plurality of programs executed by the CPU are stored in the memory 26. For example, a spectrum processing program, a composition estimation program, and the like are stored.

The operation unit 28 is implemented by a keyboard, a mouse, a pointing device, and the like. The operation unit 28 is operated by a user, and various kinds of information are input to the information processing device 16.

The display unit 30 is a display such as a liquid crystal display or an EL display. The display unit 30 displays, for example, a chromatograph, a mass spectrum, and other information.

Hereinafter, embodiments will be described.

First Embodiment

Figure 2:
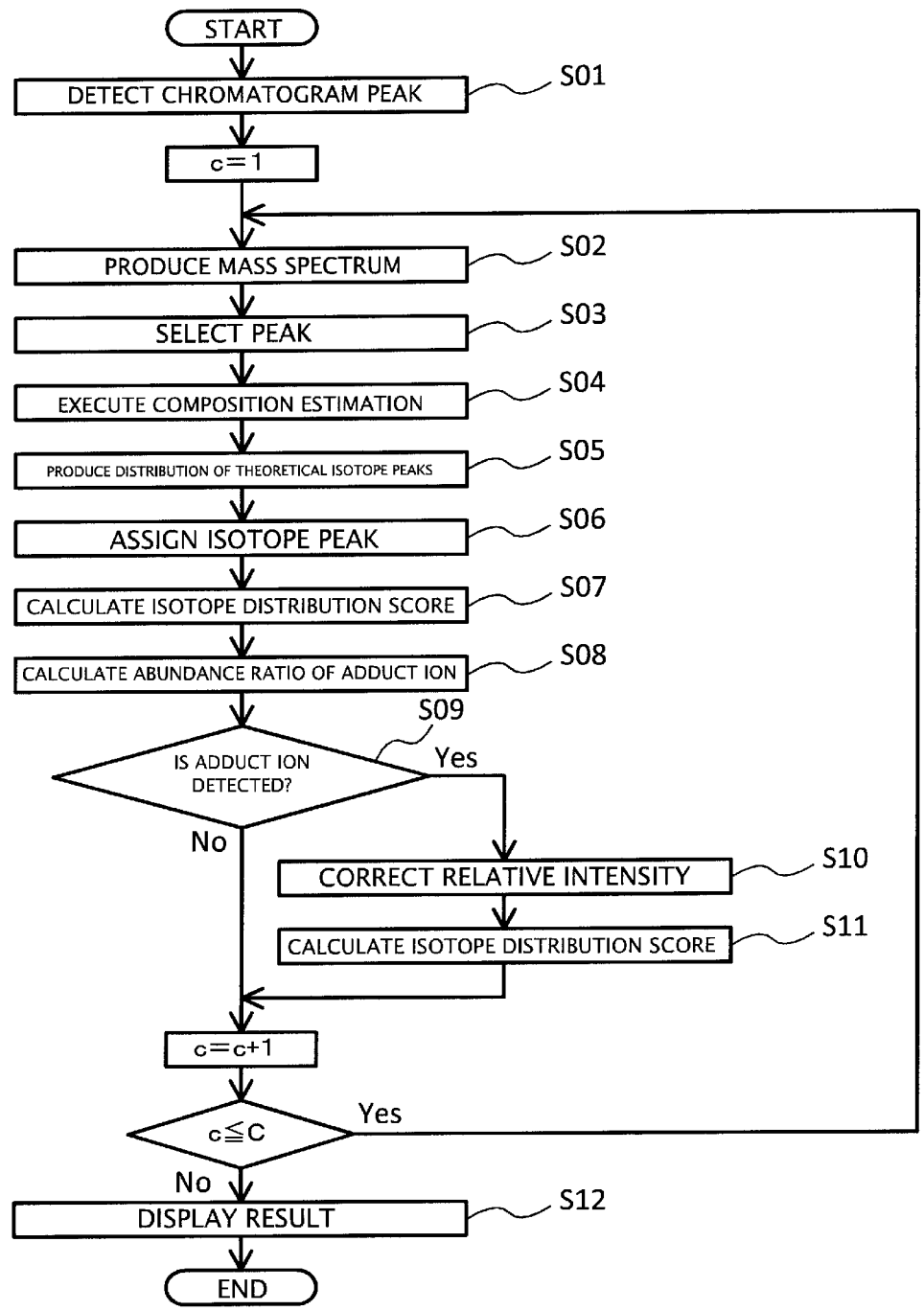
FIG. 2 is a flowchart illustrating a flow of processing according to a first embodiment.

Hereinafter, a first embodiment will be described with reference to FIG. 2. FIG. 2 illustrates a flowchart illustrating a flow of processing according to the first embodiment.

The original sample is introduced into the chromatography device 12, and chromatography data are obtained by the chromatography device 12. The processor 24 detects a peak based on the obtained chromatography data (S01). According to the peak detection, a chromatogram peak corresponding to c (c=1 to C) sample components is obtained.

First, the following processing is executed for the sample component with c=1.

A mass spectrum corresponding to a detection time is produced based on the chromatogram peak corresponding to the sample component with c=1 (S02).

The processor 24 selects a composition estimation target peak from a peak group of molecule-related ions on the mass spectrum produced in step S02 (S03). Specifically, the processor 24 selects, from the mass spectrum, a peak group having an intensity equal to or higher than a threshold and a highest mass m/z, and selects a peak having a lowest mass m/z from this peak group as the composition estimation target peak. The composition estimation target peak selected in this way is usually a monoisotopic peak of a target sample component. Further, an isotope peak is excluded from an isotope group according to a predetermined condition, and then the composition estimation target peak is selected. Known processing can be used as deisotope processing for eliminating the isotope peak. The composition estimation target peak is used to estimate a composition candidate for the sample component with c=1.

The processor 24 calculates m/z of the center of gravity of the composition estimation target peak selected in step S03, and executes composition estimation processing using the m/z to estimate a composition candidate for a molecular ion of the sample component with c=1 (S04). Known processing can be used as the composition estimation processing.

The processor 24 produces a distribution of theoretical isotope peaks (hereinafter, referred to as the "theoretical isotope peaks") based on the composition candidate for the molecular ion (S05). Specifically, the processor 24 adds up natural isotope ratios of elements constituting the candidate to generate a combination of the m/z and a relative intensity (an intensity of a monoisotopic peak is set to "1") for each isotope peak.

For each of the peaks included in the distribution of the theoretical isotope peaks, the processor 24 defines the composition estimation target peak selected in step S03 as a reference peak $P_0$, and defines peaks on a high mass side as peaks $P_1, P_2, \ldots,$ and $P_N$ for every 1 Da. The distribution of the theoretical isotope peaks has m/z ($m_n$) and a relative intensity ($I_n$) for each isotope peak $P_n$.

The processor 24 targets a distribution of actually measured isotope peaks (hereinafter, referred to as the "measured isotope peaks"), and assigns, to the theoretical isotope peak, the measured isotope peak having m/z within an m/z range predetermined based on the m/z of the theoretical isotope peaks for each theoretical isotope peak obtained in step S05 (S06). The m/z of each assigned measured isotope peak is defined as m/z ($m_{jn}$), and a relative intensity of each assigned measured isotope peak is defined as a relative intensity ($I_{jn}$). The relative intensity ($I_{jn}$) of the measured isotope peak is a value relativized with the relative intensity ($I_{jn}$) of the monoisotopic peak assigned to the peak $P_0$ as "1". In each m/z, the measured isotope peak having a relative intensity equal to or higher than the threshold is assigned. The number of the theoretical isotope peaks and the number of the measured isotope peaks are not necessarily the same.

The assigned measured isotope peaks are an example of a group of the measured isotope peaks related to the composition estimation target peak.

The processor 24 compares the relative intensity ($I_{tn}$) of each peak included in the distribution of the theoretical isotope peaks with the relative intensity ($I_{jn}$) of each peak included in the distribution of the measured isotope peaks, and calculates a degree of matching (isotope distribution score) between the relative intensities ($I_{tn}$) and ($I_{jn}$) (S07). For example, a method for calculating a general degree of matching, such as a degree of cosine similarity, is used. The processor 24 may calculate a difference between values of the relative intensities and score the difference to calculate the degree of matching.

Here, in a relative intensity of a measured isotope peak $P_1$, a true value of an abundance ratio of an isotope is defined as "1", and an abundance ratio of an adduct ion is defined as "α". That is, the relative intensity of the measured isotope peak $P_1$ includes the relative intensity of the isotope peak and the relative intensity of the adduct ion, and the abundance ratio of the two relative intensities is defined as 1:α here.

The processor 24 calculates, according to the following Formula (1), the abundance ratio of the adduct ion α at the measured isotope peak $P_1$ (S08).

$$\alpha=(\Delta m-a)/(b-\Delta m) \quad (1)$$

$\Delta m = m_{j1} - m_{j0} - 1$ $a = m_{t1} - m_{t0} - 1$ $b = 0.00783$

Δm represents a measured value of a mass defect difference between isotopes ($P_0$–$P_1$).

a represents a theoretical value of the mass defect difference between the isotopes ($P_0$–$P_1$). 0.00336, which is a mass defect difference between $^{12}C$ and $^{13}C$, may be simply used as a.

b is a mass defect of a hydrogen atom.

Δm corresponds to an example of a first mass difference between the isotopes in the distribution of the measured isotope peaks. a corresponds to an example of a second mass difference between the isotopes in the distribution of the theoretical isotope peaks.

The processor 24 uses the abundance ratio of the adduct ion a to determine whether the adduct ion is detected (S09).

For example, the processor 24 determines that the adduct ion is present if α>0, or determines that the adduct ion is not present if α≤0.

The processor 24 may set a determination reference value β in consideration of a measurement error or the like, determine that the adduct ion is present if α>β, and determine that the adduct ion is not present if α≤β.

When it is determined that the adduct ion is present (S09, Yes), for each of the measured isotope peaks, the processor 24 corrects the relative intensity of the measured isotope peak based on the abundance ratio of the adduct ion α, and then calculates the corrected relative intensity of the measured isotope peak (S10). The corrected relative intensity of the measured isotope peak is defined as a relative intensity ($I'_{jn}$). The relative intensity ($I'_{jn}$) is calculated according to the following Formula (2).

$I'_{j0} = I_{j0} = 1$ $I'_{j1} = I_{j1}/(1+\alpha)$ $I'_{jn} = I_{jn} - I'_{j(n-1)} \times I'_{j1} \times \alpha \, (n \geq 2) \quad (2)$ Here, an intensity of the peak $P_0$ (that is, monoisotopic peak) is defined as "1", and the intensity of each peak is relativized.

The corrected relative intensity ($I'_{jn}$) corresponds to an intensity obtained by subtracting the relative intensity of the adduct ion from the relative intensity ($I_{jn}$) which is a measured value (that is, a true value of the relative intensity of the isotope peak from which the relative intensity of the adduct ion is removed).

The above Formula (2) will be described in detail. When m/z of the peak $P_0$ is defined as M, m/z of peak $P_1$ is defined as M+1, m/z of peak $P_2$ is defined as M+2, and m/z of peak $P_n$ is defined as M+n, a relationship between the relative intensity $I_{jn}$ which is the measured value and the corrected relative intensity $I'_{jn}$ is defined as follows.

$M: I'_{j0} = I_{j0} = 1$ $M+1: I'_{j1} + S = I_{j1}$ $M+2: I'_{j2} + I'_{j1} \times S = I_{j2}$ $M+3: I'_{j3} + I'_{j2} \times S = I_{j3}$ The same applies to M+4 and thereafter.

Here, a coefficient S is a relative intensity corresponding to the abundance ratio of the adduct ion a in the relative intensity of the measured isotope peak. As described above, the true value of the abundance ratio of the isotope is "1" with respect to the abundance ratio of the adduct ion α. For example, an abundance ratio of a corrected relative intensity $I'_{j1}$, which is a true value, is "1" with respect to the abundance ratio of the adduct ion α.

Therefore, a relationship of $I'_{j1}:S=1:\alpha$ is established, and $S = I'_{j1} \times \alpha$.

The coefficient S is substituted into Formula for M+1 to obtain the relative intensity ($I'_{j1}$) expressed by the above-described Formula (2). By substituting the coefficient S into each Formula for M+2 and thereafter, and rearranging Formulas, the relative intensity ($I'_{jn}$) expressed by the above-described Formula (2) can be obtained.

The processor 24 compares the relative intensity ($I_{tn}$) of each peak included in the distribution of the theoretical isotope peaks with the relative intensity ($I'_{jn}$) of each peak included in the distribution of the corrected measured isotope peaks (that is, the corrected relative intensity), and calculates a degree of matching (isotope distribution score) between the two relative intensities (S11).

When it is determined in step S09 that no adduct ion is present (S09, No), the processing of steps S10 and S11 is not executed. Accordingly, the processing for the sample component with c=1 is ended. Then, the processing of steps S02 to S11 is repeated for all the sample components until c≥C.

When the processing for all the sample components is ended, the processor 24 causes the display unit 30 to display processing results for all the sample components (S12).

For example, the processing results illustrated in FIG. 3 are displayed on the display unit 30. FIG. 3 illustrates the processing results regarding 17 sample components having known compositions (sample components with c=1 to 17 respectively). For example, each of the sample components is associated with the composition, the isotope distribution score before the relative intensity is corrected, the abundance ratio of the adduct ion a, a determination result of presence of the adduct ion, the isotope distribution score after the relative intensity is corrected, and a difference (score difference) between the isotope distribution score before the correction and the isotope distribution score after the correction. All or part of these are displayed.

In the example illustrated in FIG. 3, it is determined that the adduct ion is present in 9 of the 17 components. The isotope distribution score after the correction is calculated for each of the 9 components, and regarding 7 of the 9 components, the isotope distribution score after the correction is higher than the isotope distribution score before the correction. That is, an accuracy of composition identification can be improved by correcting the relative intensity by using the abundance ratio of the adduct ion a.

Second Embodiment

Figure 4:
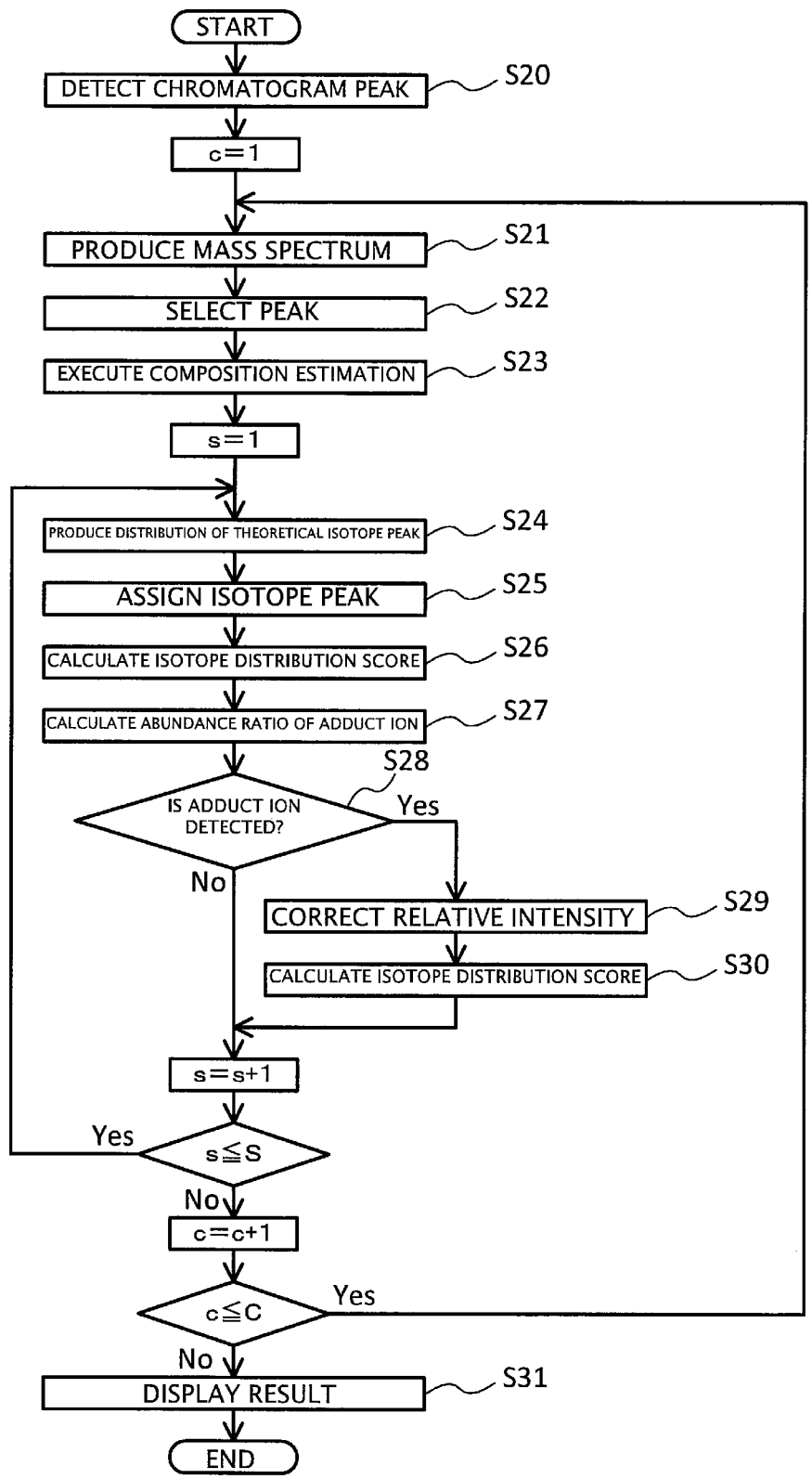
FIG. 4 is a flowchart illustrating a flow of processing according to a second embodiment.

Hereinafter, a second embodiment will be described with reference to FIG. 4. FIG. 4 illustrates a flowchart illustrating a flow of processing according to the second embodiment.

The original sample is introduced into the chromatography device 12, and the chromatography data are obtained by the chromatography device 12. The processor 24 detects a peak based on the obtained chromatography data (S20). According to the peak detection, a chromatogram peak corresponding to c (c=1 to C) sample components is obtained.

First, the following processing is executed for the sample component with c=1.

A mass spectrum corresponding to a detection time is produced based on the chromatogram peak corresponding to the sample component with c=1 (S21).

The processor 24 selects a composition estimation target peak from a peak group of molecule-related ions on the mass spectrum produced in step S21 (S22). Specifically, the processor 24 selects, from the mass spectrum, a peak group having an intensity equal to or higher than a threshold and a highest mass m/z, and selects a peak having a lowest mass m/z from this peak group as the composition estimation target peak. The composition estimation target peak selected in this way is usually a monoisotopic peak of a target sample component. Further, an isotope peak is excluded from the isotope group according to a predetermined condition, and then the composition estimation target peak is selected. The composition estimation target peak is used to estimate a composition candidate for the sample component with c=1.

FIGS. 5 and 6 each illustrate an example of the mass spectrum. FIG. 6 is an enlarged view of a portion of FIG. 5. In FIGS. 5 and 6, a horizontal axis represents m/z and a vertical axis represents a relative intensity.

A peak group 32 illustrated in FIG. 5 is a peak group having a relative intensity equal to or higher than the threshold and having the highest mass m/z. FIG. 6 illustrates the enlarged peak group 32. A peak 34 is a peak with a lowest mass m/z in the peak group 32. The processor 24 selects the peak group 32 and selects the peak 34 from the peak group 32 as the composition estimation target peak.

The processor 24 calculates m/z of the center of gravity of the composition estimation target peak (that is, the peak 34) selected in step S22, and executes the composition estimation processing using the m/z to estimate a composition candidate for a molecular ion of the sample component with c=1 (S23). The m/z of the center of gravity of the peak 34 is 227.11985, and this value is used to estimate the composition candidate for the molecular ion of the sample component. For example, s (s=1 to S) candidates are estimated.

FIG. 7 illustrates a list of composition candidates estimated in step S23. In the example illustrated in FIG. 7, four candidates (candidates with s=1 to 4) are estimated, and a theoretical value of m/z of each candidate is calculated.

First, the following processing is executed for the composition candidate with s=1 (that is, C9H17N5S) of the sample component with c=1.

The processor 24 produces a distribution of theoretical isotope peaks for the candidate with s=1 (S24). Specifically, the processor 24 adds up natural isotope ratios of elements constituting the candidate with s=1 to generate a combination of m/z and a relative intensity (an intensity of a monoisotopic peak is "1") for each of the isotope peaks.

For each of the peaks included in the distribution of the theoretical isotope peaks, the processor 24 defines the composition estimation target peak selected in step S22 as a reference peak $P_0$, and defines peaks on a high mass side as peaks $P_1, P_2, \ldots,$ and $P_N$ for every 1 Da. The distribution of the theoretical isotope peaks has m/z ($m_{jn}$) and a relative intensity ($I_{jn}$) for each isotope peak $P_1$.

(a) in FIG. 8 illustrates the m/z ($m_{jn}$) and the relative intensity ($I_{jn}$) of each theoretical isotope peak (peaks $P_0$ to $P_6$) for s=1.

The processor 24 targets a distribution of measured isotope peaks which are isotope peaks actually measured, and assigns, to the theoretical isotope peak, the measured isotope peak having the m/z within an m/z range predetermined based on the m/z of the theoretical isotope peak for each theoretical isotope peak obtained in step S24 (S25). The m/z of each assigned measured isotope peak is defined as m/z ($m_{jn}$), and a relative intensity of each assigned measured isotope peak is defined as a relative intensity ($I_{jn}$). The relative intensity ($I_{jn}$) of the measured isotope peak is a value relativized with the relative intensity ($I_{jn}$) of the monoisotopic peak assigned to the peak $P_0$ as "1". In each m/z, the measured isotope peak having a relative intensity equal to or higher than the threshold is assigned. The number of the theoretical isotope peaks and the number of the measured isotope peaks are not necessarily the same.

(b) in FIG. 8 illustrates m/z ($m_{jn}$) and the relative intensity ($I_{jn}$) of each measured isotope peak (peaks $P_0$ to $P_3$) for s=1.

The processing of step S25 will be described in detail. The processor 24 assigns, to the theoretical isotope peak corresponding to the peak $P_0$, the measured isotope peak having the m/z within a m/z range predetermined based on m/z ($m_{r0}$) of the theoretical isotope peak corresponding to the peak $P_0$. The m/z ($m_{r0}$) of the theoretical isotope peak corresponding to the peak $P_0$ is 227.11992, and the processor 24 assigns, to the theoretical isotope peak corresponding to the peak $P_0$, the measured isotope peak having the m/z within a m/z range predetermined based on the value of 227.11992. In an example illustrated in (b) in FIG. 8, the measured isotope peak with m/z of 227.11985 is detected. m/z (=227.11985) is included in the m/z range predetermined based on the m/z ($m_{r0}$) (=227.11992) of the theoretical isotope peak corresponding to the peak $P_0$. Therefore, the processor 24 assigns the measured isotope peak with m/z of 227.11985 to the theoretical isotope peak corresponding to the peak $P_0$.

The theoretical isotope peak with the m/z ($m_{r0}$) of 227.11992 and the measured isotope peak with the m/z ($m_{j0}$) of 227.11985 are made peaks corresponding to the peak $P_0$ for the composition candidate with s=1.

For each peak from the peak $P_1$, the measured isotope peak is assigned to the theoretical isotope peak as in the case of the peak $P_0$.

The assigned measured isotope peaks are an example of a group of the measured isotope peaks related to the composition estimation target peak.

The processor 24 compares the relative intensity ($I_{jn}$) of each peak included in the distribution of the theoretical isotope peaks with the relative intensity ($I_{jn}$) of each peak included in the distribution of the measured isotope peaks, and calculates a degree of matching (isotope distribution score) between the relative intensities ($I_{jn}$) and ($I_{jn}$) (S26). For example, a method for calculating a general degree of matching, such as a degree of cosine similarity, is used. The processor 24 may calculate a difference between the values of the relative intensities and score the difference to calculate the degree of matching.

Similar to the first embodiment, in a relative intensity of the measured isotope peak $P_1$, a true value of an abundance ratio of an isotope is defined as "1", and an abundance ratio of an adduct ion is defined as "$\alpha$".

The processor 24 calculates the abundance ratio of the adduct ion a at the measured isotope peak $P_1$ according to the above-described Formula (1) (S27). The definitions of $\Delta m$, a, and b are the same as the definitions according to the first embodiment. (a) in FIG. 9 illustrates $\alpha$, a, b, and $\Delta m$.

The processor 24 uses the abundance ratio of the adduct ion a to determine whether the adduct ion is detected (S28).

For example, the processor 24 determines that the adduct ion is present if $\alpha>0$, or determines that the adduct ion is not present if $\alpha \leq 0$.

The processor 24 may set a determination reference value $\beta$ in consideration of a measurement error or the like, determine that the adduct ion is present if $\alpha>\beta$, and determine that the adduct ion is not present if $\alpha \leq \beta$.

(b) in FIG. 9 illustrates the determination result of the presence or absence of the adduct ion. Here, it is determined that the adduct ion is present.

When it is determined that the adduct ion is present (S28, Yes), for each of the measured isotope peaks, the processor 24 corrects the relative intensity of the measured isotope peak based on the abundance ratio of the adduct ion a, and then calculates a relative intensity of the corrected measured isotope peak (S29). The relative intensity of the corrected measured isotope peak is defined as a relative intensity ($I'_{jn}$). The relative intensity ($I'_{jn}$) is calculated according to the above-described Formula (2).

(c) in FIG. 8 illustrates the corrected relative intensity ($I'_{jn}$).

The processor 24 compares the relative intensity ($I_{jn}$) of each peak included in the distribution of the theoretical isotope peaks with the relative intensity ($I'_{jn}$) of each peak included in the distribution of the corrected measured isotope peaks (that is, the corrected relative intensity), and calculates a degree of matching (isotope distribution score) between the two relative intensities (S30).

Accordingly, the processing for the composition candidate with s=1 for the sample component with c=1 is ended. That is, the processing for the composition candidate with s=1 (C9H17N5S) (see FIG. 7) is ended. Then, the processing of steps S24 to S30 is repeated for all composition candidates while s≤S (S=4 in the example illustrated in FIG. 7).

When s>S, the processing for the sample component with c=1 is ended, and then the processing of steps S21 to S30 is repeated for all the sample components while c≤C.

When the processing for all the sample components is ended, the processor 24 causes the display unit 30 to display the processing results for all the sample components (S31).

FIG. 10 illustrates a spectrometry result regarding a sample having a known composition (molecular composition is C9H17N5S). That is, the processing of steps S20 to S30 is performed on the sample whose molecular composition is known to be C9H17N5S, and the spectrometry result is illustrated in FIG. 10.

Specifically, for each of the composition candidates with s=1 to 4, the determination result of the adduct ion, the isotope distribution score before the correction, the isotope distribution score after the correction, a ranking of the isotope distribution score before the correction, and a ranking of the isotope distribution score after the correction are illustrated. The isotope distribution score before the correction is the value calculated in step S26; that is, the value calculated by using the distribution of the measured isotope peaks before the correction. The isotope distribution score after the correction is the value calculated in step S30; that is, the value calculated by using the distribution of the measured isotope peaks after the correction (that is, the distribution of the corrected measured isotope peaks). The isotope distribution score is calculated by using a cosine similarity, and the closer the value is to "1", the higher the degree of matching. The closer the isotope distribution score is to "1"; that is, the higher the degree of matching, the higher the ranking of the isotope distribution score.

The candidate with s=1 (that is, C9H17N5S) is the composition of the sample actually measured. For the candidate with s=1, a ranking before the correction is 4th, but a ranking after the correction is 1st. That is, by correcting the relative intensity of the measured isotope peak by using the abundance ratio of the adduct ion $\alpha$, the isotope distribution score of the correct composition candidate increases, and the score ranking is moved up.

The processor 24 may display, on the display unit 30, a comparison result between the relative intensity of the theoretical isotope peak and the relative intensity of the measured isotope peak. In this case, the processor 24 may display the comparison result before the correction on the display unit 30, or may display the comparison result after the correction on the display unit 30. When the user instructs to switch the display of the comparison result by using the operation unit 28, the processor 24 may switch a display target from the comparison result before the correction to the comparison result after the correction, or may switch the display target from the comparison result after the correction to the comparison result before the correction according to an instruction. The processor 24 may display both the comparison result before the correction and the comparison result after the correction on the display unit 30 at the same time.

FIG. 11 illustrates the comparison result before the correction. FIG. 12 illustrates the comparison result after the correction. In FIGS. 11 and 12, a horizontal axis represents the peak $P_n$, and a vertical axis represents the relative intensity. FIG. 12 illustrates the relative intensity of the measured isotope peak after the correction as well as the relative intensity of the measured isotope peak before the correction. For example, the comparison result illustrated in FIG. 11 and the comparison result illustrated in FIG. 12 are displayed on the display unit 30. According to the instruction of the user, in the comparison result illustrated in FIG. 12, the relative intensity after the correction may be displayed without displaying the relative intensity of the measured isotope peak before the correction, or the relative intensity before the correction may be displayed together with the relative intensity after the correction.

Third Embodiment

In the first embodiment and the second embodiment, even if the peak determined and selected as the peak of the molecular weight-related ion is an ion in which hydrogen is desorbed from the molecular compositions such as [M-H]+, [M-H$_2$]+, . . . , and [M-H$_n$], the same processing as in the first embodiment and the second embodiment may be performed with the reference peaks P$_0$ in the first embodiment and the second embodiment as the peak of the ion whose H$_n$ is desorbed from the molecular ion. In that case as well, peaks on the high mass side are defined as peaks P$_1$, P$_2$, . . . , and P$_N$ every 1 Da based on the reference peak. Each peak is interpreted as a peak having a composition to which H is added when viewed from the reference peak P$_0$, and the presence or absence of the adduct ion is determined. In the third embodiment, the presence or absence of the desorbed ion is determined, and other configurations and processing are the same as the configurations and the processing according to the first embodiment and the second embodiment.

Fourth Embodiment

In a fourth embodiment, the ion source 18 is an ion source utilizing a soft ionization method. In a molecular weight-related ion on a mass spectrum obtained by the soft ionization method, when it is determined that an adduct ion is present, the processor 24 calculates a total number of electrons from a composition of a candidate, and determines whether the calculated total number of electrons is odd. If the calculated total number of electrons is odd, the processor 24 corrects a relative intensity and calculates an isotope distribution score based on the corrected relative intensity. If the calculated total number of electrons is not odd (that is, the calculated total number of electrons is even), the processor 24 targets the composition of the candidate, and does not perform the correction on the relative intensity and the calculation of the isotope distribution score using the corrected relative intensity.

Figure 13:
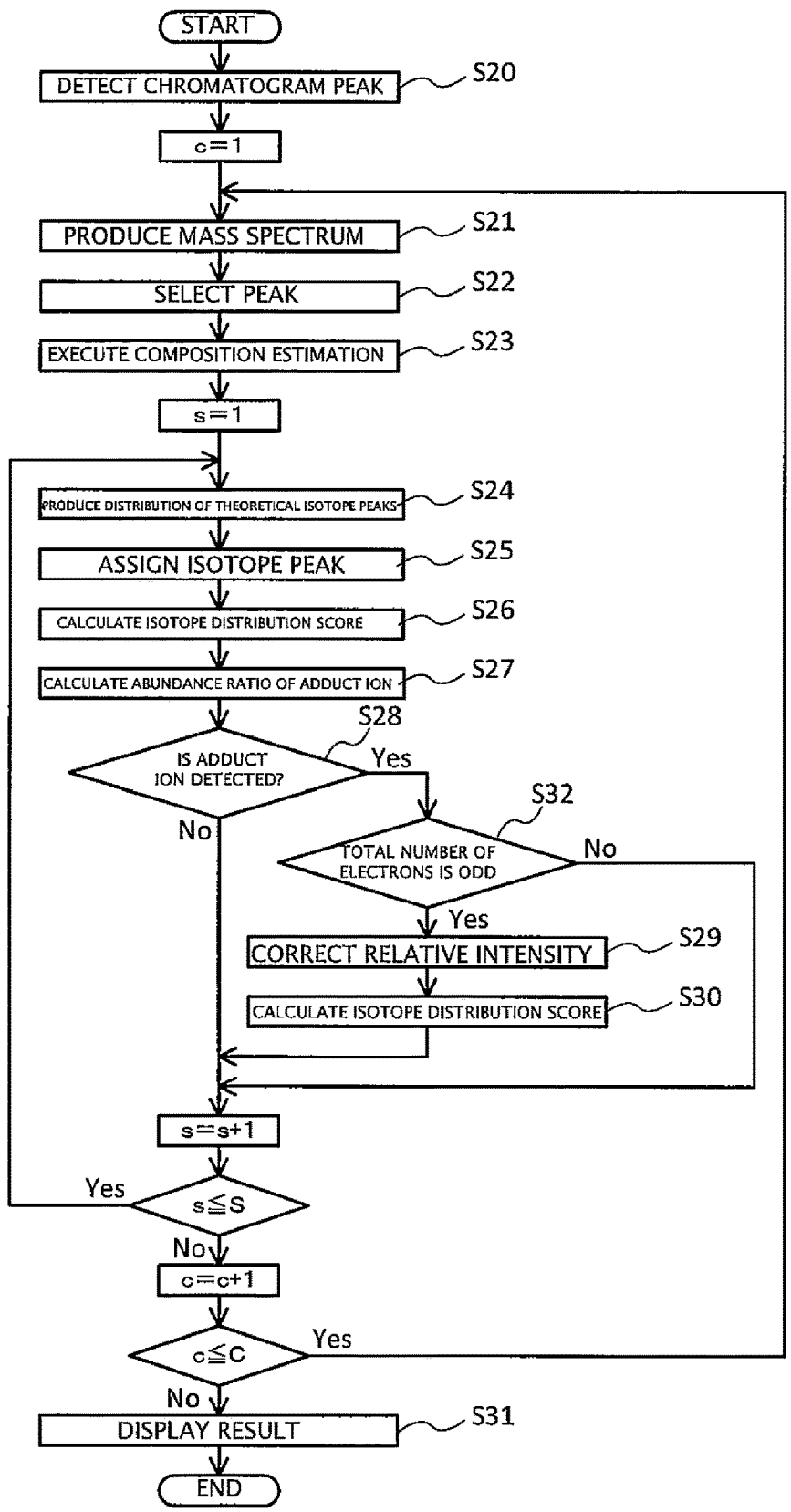
FIG. 13 is a flowchart illustrating a flow of processing according to a fourth embodiment.

FIG. 13 illustrates a flowchart illustrating a flow of processing according to the fourth embodiment. As illustrated in FIG. 13, the processing according to the fourth embodiment includes the processing of steps S20 to S31 (see FIG. 4) according to the second embodiment and processing of step 32.

When it is determined by the processing of step S28 that the adduct ion is present (S28, Yes), the processor 24 executes the processing of step S32. In step S32, the processor 24 calculates a total number of electrons from a composition s which is a candidate and determines whether the total number of electrons is odd. If the total number of electrons is odd (S32, Yes), the processor 24 executes the processing of steps S29 and S30 as in the second embodiment. If the total number of electrons is not odd (S32, No), the processor 24 does not execute the processing of steps S29 and S30. That is, the composition whose total number of electrons is not odd is excluded from the candidates.

A degree of unsaturation may be used instead of the total number of electrons. When using the degree of unsaturation, the processor 24 determines whether the degree of unsaturation is an integer. If the degree of unsaturation is not an integer (that is, the degree of unsaturation has a fraction), the processor 24 does not perform the processing of steps S29 and S30. If the degree of unsaturation is an integer, the processor 24 executes the processing of steps S29 and S30.

Figures 14, 15:
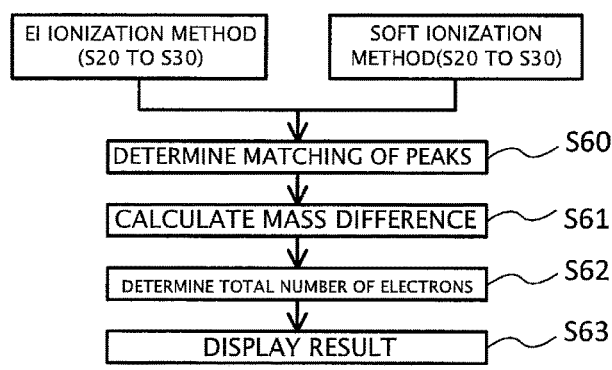
FIG. 14 is a diagram illustrating a spectrometry result of the fourth embodiment.
FIG. 15 is a flowchart illustrating a flow of processing according to a fifth embodiment.

FIG. 14 illustrates a spectrometry result of the fourth embodiment. The spectrometry result is a spectrometry result for the sample whose composition is known (the molecular composition is C9H17N5S). That is, the processing of steps S20 to S30 and S32 is performed on the sample whose molecular composition is known to be C9H17N5S, and the spectrometry result is illustrated in FIG. 14.

Specifically, for each of the composition candidates with s=1 to 4, there are illustrated the determination result of the adduct ion, an isotope distribution score before the correction, an isotope distribution score after the correction, a ranking of the isotope distribution score before correction, a ranking of the isotope distribution score after the correction, a total number of electrons, and a determination result of the total number of electrons. The total number of electrons is a value calculated by the processing of step S32.

The total numbers of electrons in compositions with s=1 and 4 are odd, and the total numbers of electrons in compositions with s=2 and 3 are even. Since the total number of electrons in the compositions with s=2 and 3 are even, the compositions with s=2 and 3 are excluded from the candidates.

By executing the determination on the total number of electrons, two candidates (the composition candidates with s=2 and 3) each having an even total number of electrons are excluded from the four candidates, and two candidates each having an odd total number of electrons (the composition candidate candidates with s=1 and 4) remain. Candidates that are more correct can be obtained, including the ranking of the isotope distribution score after the correction.

Fifth Embodiment

In a fifth embodiment, measurement is performed by using the ion source 18 according to an EI ionization method, and the processing according to the second embodiment is executed. The measurement is performed by using the ion source 18 utilizing a soft ionization method, and the processing according to the second embodiment is executed. That is, the processing according to the second embodiment is executed according to the EI ionization method and the soft ionization method.

The processor 24 compares a chromatogram peak obtained by the EI ionization method with a chromatogram peak obtained by the soft ionization method, and calculates an m/z difference ($\Delta mP_0$) of a reference peak selected from a mass spectrum if a peak having the same component is present. If the difference is within a predetermined tolerance, the processor 24 determines whether a target component is either a molecular ion or an H$_n$ desorbed ion in consideration of the presence determination results of the adduct ions in the EI ionization method and the soft ionization method. Further, the processor 24 may calculate the total number of electrons in the EI ionization method and the soft ionization method, and narrow down the composition candidates depending on whether the total number of electrons is odd or even.

It is assumed that a cation-added molecule is not detected in the EI ionization method and a reference peak detected by the soft ionization method is not a desorbed ion, if m/z of a reference peak detected by the EI ionization method matches m/z of the reference peak detected by the soft ionization method, the reference peak can be determined to be a molecular ion.

When it can be confirmed that the adduct ion is present in the molecular weight-related ion, the EI ionization method or the soft ionization method can be used to determine where the molecular ion peak is located in the isotope peak of the molecular weight-related ion.

Accordingly, the processor 24 determines whether a reference peak obtained by using other ionization methods is a molecular ion or an $H_n$ desorbed ion.

FIG. 15 illustrates a flowchart illustrating a flow of processing according to the fifth embodiment.

The ion source 18 according to the EI ionization method is used, and the processor 24 executes the processing of steps S20 to S30 (see FIG. 4) until c>C. The ion source 18 utilizing the soft ionization method is used, and the processor 24 executes the processing of steps S20 to S30 (see FIG. 4) until c>C.

The processor 24 determines whether the chromatogram peak obtained by the EI ionization method matches the chromatogram peak obtained by the soft ionization method (S60). Specifically, the processor 24 determines whether the same component is detected based on information obtained by the EI ionization method and information obtained by the soft ionization method. For example, the processor 24 may determine whether the same component is detected depending on whether retention times (RT) of the chromatogram peaks obtained by the methods are included in a predetermined tolerance, or may determine whether the same component is detected based on a degree of matching of intensity patterns between the peaks.

Next, the processor 24 calculates a difference between a mass (specifically m/z) of the reference peak obtained by the EI ionization method and a mass (specifically m/z) of the reference peak obtained by the soft ionization method (S61). When it is determined in step S60 that the same component is detected, the processor 24 calculates a difference $\Delta mp_0$ (for example, a value obtained by subtracting m/z of a reference peak $P_0$ obtained by the EI ionization method from m/z of a reference peak $P_0$ obtained by the soft ionization method) between a measured m/z of the reference peak $P_0$ selected on the mass spectrum obtained by the EI ionization method and m/z of the reference peak $P_0$ selected on the mass spectrum obtained by the soft ionization method.

Next, the processor 24 calculates the total number of electrons from the composition candidate obtained by the EI ionization method, and calculates the total number of electrons from the composition candidate obtained by the soft ionization method (S62).

Based on $\Delta mP_0$ calculated in step S61 and the presence or absence of the adduct ion, the processor 24 determines whether the reference peak obtained by the EI ionization method and the reference peak obtained by the soft ionization method are peaks derived from the molecular ion or peaks derived from the $H_1$ desorbed ion. Further, the processor 24 excludes a candidate according to the total number of electrons. Hereinafter, a specific method will be described.

When $\Delta mP_0 = 0 \pm \gamma$, the processor 24 determines that the reference peak obtained by the EI ionization method and the reference peak obtained by the soft ionization method are peaks derived from the molecular ion. Further, the processor 24 excludes a composition having an even number of electrons from the composition candidates obtained by the EI ionization method and the composition candidates obtained by the soft ionization method.

When $\Delta mP_0 = -1 \pm \gamma$ and it is determined that the adduct ion is present in a distribution of peaks obtained by at least one of the EI ionization method and the soft ionization method, the processor 24 determines that the reference peak obtained by the EI ionization method is a peak derived from an H desorbed ion, and excludes a candidate having an odd total number of electrons from the composition candidates by the EI ionization method. Further, the processor 24 determines that the reference peak obtained by the soft ionization method is a peak derived from a molecular ion, and excludes a candidate having an even number of electrons from the composition candidates obtained by the soft ionization method.

When $\Delta mP_0 = -2 \pm \gamma$ and it is determined that the adduct ion is present in a distribution of peaks obtained by the soft ionization method, the processor 24 determines that the reference peak obtained by the EI ionization method is a peak derived from an $H_2$ desorbed ion, and excludes a candidate having an even total number of electrons from the composition candidates obtained by the EI ionization method. Further, the processor 24 determines that the reference peak obtained by the soft ionization method is a peak derived from a molecular ion, and excludes a candidate having an even number of electrons from the composition candidates obtained by the soft ionization method.

$\gamma$ represents a value caused by a measurement error of a mass spectrometer, and is usually a value of about 0.01.

The processor 24 causes the display unit 30 to display the result obtained in step S62 (S63).

According to the embodiments, whether the molecular ion and the adduct ion are detected simultaneously on the mass spectrum can be determined. When it is determined that the adduct ion is present, the correct composition can be determined by correcting the intensity of the measured isotope peak. By narrowing down the composition candidates using the total number of electrons, the correct composition can be further determined.

The invention claimed is:

1. A method, comprising:
producing, by an ion source of a mass spectrometer, a plurality of ions using a compound of a plurality of compounds based on an ionization method, wherein the compound is received from a chromatography device;
producing, by at least one processor, a mass spectrum by performing mass spectrometry on the plurality of ions;
selecting, by at least one processor, a composition estimation target peak from the mass spectrum and a group of measured isotope peaks related to the composition estimation target peak;
estimating, by at least one processor, a composition candidate of the sample based on the composition estimation target peak;
calculating, by at least one processor, a distribution of a theoretical isotope peak corresponding to the composition candidate;
calculating, by at least one processor, an abundance ratio of an adduct ion or a desorbed ion in the sample based on a difference between the first mass difference and the second mass difference;
determining, by at least one processor, presence or absence of the adduct ion or the desorbed ion in the sample based on a first mass difference between isotopes in a distribution of the measured isotope peaks and a second mass difference between isotopes in the distribution of the theoretical isotope peak; and
in response to determining the presence of the adduct ion or the desorbed ion in the sample, correcting, by at least one processor, an intensity of the measured isotope peaks based on the abundance ratio to obtain corrected measured isotope peaks; and calculating, by at least one processor, an intensity of the corrected measured isotope peaks.

2. The method according to claim 1, further comprising:
calculating, by at least one processor, a degree of matching between an intensity of a distribution of the corrected measured isotope peaks and an intensity of the distribution of the theoretical isotope peak.

3. The method according to claim 2, further comprising:
estimating, by at least one processor, a plurality of composition candidates for the sample based on the composition estimation target peak;
calculating, by at least one processor, the distribution of the theoretical isotope peak for each of the composition candidates;
calculating, by at least one processor, the abundance ratio for each of the composition candidates;
correcting, by at least one processor, the intensity of the measured isotope peaks based on the abundance ratio, and then calculating the intensity of the corrected measured isotope peaks for each of the composition candidates;
calculating, by at least one processor, a degree of matching between the intensity of the corrected measured isotope peak and the intensity of the theoretical isotope peak for each of the composition candidates; and
displaying, by at least one processor, the degree of matching for each of the composition candidates.

4. A spectrometry system, comprising:
a mass spectrometry unit comprising at least one processor configured to:
produce a plurality of ions using a compound of a plurality of compounds based on an ionization method, wherein the compound is received from a chromatography device;
produce a mass spectrum by performing mass spectrometry on the plurality of ions;
a selection unit comprising at least one processor configured to select a composition estimation target peak from the mass spectrum, and a group of measured isotope peaks related to the composition estimation target peak;
an estimation unit comprising at least one processor configured to estimate a composition candidate for the sample based on the composition estimation target peak;
a first calculation unit comprising at least one processor configured to calculate a distribution of a theoretical isotope peak corresponding to the composition candidate;
a second calculation unit comprising at least one processor configured to calculate an abundance ratio of an adduct ion or a desorbed ion in the sample based on a difference between the first mass difference and the second mass difference;
a determination unit comprising at least one processor configured to determine presence or absence of the adduct ion or the desorbed ion in the sample based on a first mass difference between isotopes in a distribution of the measured isotope peaks and a second mass difference between isotopes in the distribution of the theoretical isotope peak; and
a third calculation unit comprising at least one processor configured to correct an intensity of the measured isotope peaks based on the abundance ratio to obtain corrected measured isotope peaks, and then calculate an intensity of the corrected measured isotope peaks in response to determining the presence of the adduct ion or the desorbed ion in the sample.

5. The spectrometry system according to claim 4, further comprising:
a fourth calculation unit comprising at least one processor configured to calculate a degree of matching between an intensity of a distribution of the corrected measured isotope peaks and an intensity of the distribution of the theoretical isotope peak.

6. The spectrometry system according to claim 5, further comprising:
a display control unit comprising at least one processor configured to display information on a display unit, wherein
the at least one processor of the estimation unit estimates a plurality of composition candidates for the sample based on the composition estimation target peak,
the at least one processor of the first calculation unit calculates the distribution of the theoretical isotope peak for each of the composition candidates,
the at least one processor of the second calculation unit calculates the abundance ratio for each of the composition candidates,
the at least one processor of the third calculation unit calculates the intensity of the corrected measured isotope peaks for each of the composition candidates,
the at least one processor of the fourth calculation unit calculates a degree of matching between the intensity of the corrected measured isotope peak and an intensity of the theoretical isotope peak for each of the composition candidates, and
the at least one processor of the display control unit displays the degree of matching on the display unit for each of the composition candidates.

* * * * *